United States Patent Office 2,897,189
Patented July 28, 1959

2,897,189

METALLIFEROUS AZO-DYESTUFFS

Alfred Fasciati, Bottmingen, Switzerland, assignor to Ciba Limited, Basel, Switzerland, a Swiss firm No Drawing. Application October 17, 1955
Serial No. 541,041

Claims priority, application Switzerland
December 21, 1951

11 Claims. (Cl. 260—147)

This application is a continuation-in-part of my application Serial No. 327,033, filed December 19, 1952 (now abandoned).

According to this invention valuable new metalliferous azo-dyestuffs are made by treating with an agent yielding cobalt a monoazo-dyestuff which is free from sulfonic acid groups, contains a single carboxylic acid group which is not bound in a position vicinal to a hydroxyl group or —NH$_2$ group, and corresponds to the general formula (1) 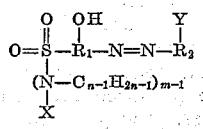

in which Y represents an amino or hydroxyl group, R$_1$ represents a benzene radical bound to the azo linkage in ortho-position to the hydroxyl group

represents the radical of a coupling component bound to the azo linkage in a position vicinal to the group Y, $n$ represents a whole number not greater than 7, $m$ represents the whole number 1 or 2, and X represents an aryl radical containing the aforesaid single carboxylic acid group.

The monoazo-dyestuffs of the above formula serving as starting materials in the present process can be made by coupling a coupling-component free from sulfonic acid groups and carboxylic acid groups and capable of coupling in a position vicinal to an amino or hydroxyl group, with a diazotized amine free from sulfonic acid groups and corresponding to the general formula (2) 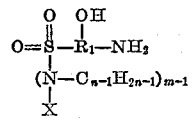

which contains in the radical X a carboxylic acid group which is not present in a position vicinal to a hydroxyl or —NH$_2$ group (i.e. the said carboxylic acid group is the only salt forming group present in the radical X), the symbols R$_1$, $n$, $m$ and X having the meanings given in connection with Formula 1.

The benzene radical R$_1$ of these amines, which contains the amino group in the 2-position and the hydroxyl group in the 1-position, may be bound to the —SO$_2$— group in the 4-, 5- or 6-position. It may contain further substituents incapable of salt formation, for example, an alkyl, alkoxy or acylamino group, a halogen atom or a nitro group. The aryl radical X may, for example, be a naphthalene or advantageously a benzene radical which in addition to the carboxylic acid group may contain further substituents which do not impart solubility in water, such as an alkyl group (for example, methyl), a methoxy group, a chlorine atom or the like.

As amines of the Formula 2 there may be mentioned: 2-amino-1-hydroxybenzene-4-sulfonic acid-N-2'-naphthylamide-3' carboxylic acid, 2-amino-1-hydroxy-6-chlorobenzene-4-sulfonic acid phenylamide-2'-carboxylic acid, 2-amino-1-hydroxy-6-nitrobenzene-4-sulfonic acid phenylamide-2'-carboxylic acid, 2-amino-1-hydroxybenzene-4- or 5-sulfonic acid N-methylphenylamide-2'-carboxylic acid, 2-amino-1-hydroxybenzene-4 or 5-sulfonic acid phenylamide-2'-, 3'- or -4'-carboxylic acid, 2-amino-4-chloro-1-hydroxybenzene-5- or -6-sulfonic acid phenylamide-2'-carboxylic acid, 3-amino-4-hydroxydiphenylsulfone-2'-carboxylic acid and 4-amino-3-hydroxydiphenylsulfone-2'- or -4'-carboxylic acid.

As coupling components for preparing the monoazo-dyestuffs serving as starting materials in the present process there come into consideration amino-compounds or advantageously hydroxy-compounds, which are capable of coupling in a position vicinal to the amino or hydroxyl group. As amino-compounds of this kind there may be mentioned, for example, naphthylamines such as β-naphthylamine, 2-naphthylamine-6-sulfonic acid amide and the like. By hydroxy-compounds there are to be understood aromatic hydroxy-compounds as well as compounds which owe their capacity for coupling to the presence of a keto-methylene group, since it is generally recognized that after coupling these latter compounds are present in the enol form, that is to say, they contain a hydroxyl group in a position vicinal to the azo linkage. The latter compounds may contain the keto-methylene group either in an open chain or in a heterocyclic ring.

As hydroxy-compounds of the aforesaid kind there may be mentioned: Para-substituted hydroxybenzenes such as 4-methyl-, 3:4-dimethyl-, 4-tertiary-amyl- or 4-acetylamino-1-hydroxybenzene and 4-methyl-2-acetylamino-1-hydroxybenzene. Dihydroxybenzenes such as resorcinol, hydroxynaphthalenes such as 2-hydroxynaphthalene, 2:6-dihydroxynaphthalene, 2-hydroxy-6-bromo- or -6-methoxynaphthalene, 2-hydroxynaphthalene-6-sulfonic acid anilide, 2-hydroxynaphthalene-6- or -7-sulfonic acid phenyl ester and 1-hydroxy-4-methylnaphthalene, 1-hydroxy-5-chloronaphthalene, 1-hydroxy-5:8 - dichloronaphthalene, and also 1-hydroxynaphthalene-3-, -4- or -5-sulfonic acid isopropylamide, 1-acylamino-7-hydroxynaphthalene such as 1-acetylamino-, 1-n-butyrylamino- or 1-benzoylamino-7-hydroxynaphthalene, 7- hydroxynaphthyl-(1)-carbamic acid methyl, ethyl or phenyl ester. Pyrazolones such as 3-methyl- or 3-phenyl-5-pyrazolone, 1-n-butyl-3-methyl-5 - pyrazolone, 1 - phenyl - 3-methyl-5-pyrazolone, 1-(2'-, 3'- or 4'-chloro)-phenyl-3-methyl-5-pyrazolone, 5-pyrazolone - 3 - carboxylic acid amides such as 5-pyrazolone-3-carboxylic acid amide, 5-pyrazolone-3-carboxylic acid-N-methyl-, ethyl-, isopropyl- or -butylamide, 5-pyrazolone-3-carboxylic acid-2'-, 3'- or 4'-chlorophenylamide, 5-pyrazolone-3-carboxylic acid-phenyl- or paramethylphenylamide, 1-phenyl-5-pyrazolone-3-carboxylic acid amide, 1-phenyl-5-pyrazolone-3-carboxylic acid methyl-, -isopropyl-, phenyl- or para-chlorophenylamide, barbituric acids such as barbituric acid itself, dihydroxyquinolines such as 2:4-dihydroxyquinoline, acylacetic acid esters or amides such as acetoacetic acid ethyl or phenyl ester, acetoacetic acid amide, acetoacetic acid-methyl-, -butyl- or -phenyl-amide, acetoacetic acid-dimethylamide, acetoacetic acid-2'-, -3'- or -4'-chlorophenylamide, benzoyl-acetic acid amide, and benzoyl-acetic acid phenylamide. Especially valuable results are obtained with those of the compounds listed whose molecular weight is relatively high.

The amines of the Formula 2 may be diazotized in the usual manner, for example, with the use of sodium nitrite and hydrochloric acid. Coupling of the resulting diazo compounds with the aforesaid coupling components can also be carried out in the usual manner, for example, in an acid to neutral medium, when the coupling component is capable of coupling in a position vicinal to an amino group, and advantageously in an alkaline medium when hydroxy-compounds are used as coupling components.

When the coupling reaction is finished the dyestuffs can be separated from the coupling mixture easily by filtration, since they are in general only slightly soluble in water.

With agents yielding cobalt, compounds of the 1:2-type are easily obtained and are especially valuable.

The treatment with an agent yielding cobalt is advantageously carried out in such manner that the resulting cobaltiferous azo-dyestuff contains one atom of cobalt in complex union with two monoazo-dyestuff molecules. For this purpose it is generally desirable to use a quantity of the agent yielding metal corresponding to one gram-atom of metal for every two molecular proportions of a dyestuff of the general Formula 1 or for about one molecular proportion of each of two different monoazo-dyestuffs free from sulfonic acid groups in a mixture of such dyestuffs of which at least one corresponds to the general Formula 1, and/or to carry out the metallization in a weakly acid to alkaline medium. Accordingly, there are suitable, for example, those metal compounds which are stable to alkaline media, for example, cobalt compounds of aliphatic ortho-hydroxy-carboxylic acids, which compounds contain the metal in complex union. As examples of aliphatic hydroxy-carboxylic acids there may be mentioned inter alia lactic acid, glycollic acid, citric acid and especially tartaric acid. As agents yielding cobalt there also come into consideration simple salts of divalent cobalt such as cobalt sulfate, cobalt acetate, or cobalt formate, if desired also cobalt hydroxide. Conversion of the dyestuffs into their complex metal compounds is advantageously carried out at a raised temperature, under atmospheric or superatmospheric pressure, for example, at the boiling temperature of the reaction mixture, if desired in the presence of suitable additions, for example, in the presence of salts of organic acids, bases, organic solvents or other agents assisting the formation of complexes.

The metallization treatment described above may be applied, for example, to a single dyestuff of the formula 1. However, it is also possible and is in many cases of advantage (for example, in order to produce different tints) to metallize a mixture of two different dyestuffs of that formula or a mixture consisting of a dyestuff of the said formula and another metallizable monoazo-dyestuff free from sulfonic acid and advantageously also free from carboxylic acid groups, for example, an ortho:ortho'-di-hydroxy monoazo-dyestuff.

The monoazo-dyestuffs to be used as starting materials in the last mentioned form of the process together with dyestuffs of the Formula 1, may be of any desired constitution provided that they are free from sulfonic acid groups and advantageously also free from carboxylic acid groups. There come into consideration both ortho:ortho'-dihydroxy- and ortho-hydroxy-ortho'-carboxy monoazo-dyestuffs which belong, for example, to the benzene-azo-benzene, benzene-azo-naphthalene, benzene-azo-pyrazolone or benzene-azo-acylacetic acid amide series. These monoazo dyestuffs can be made from the coupling components mentioned above by coupling them with diazo compounds of the following amines: 4-chloro-, 4-nitro-, 4-methyl-2-amino - 1 - hydroxybenzene, 4:6-dichloro- or 4:6-dinitro-2-amino-1-hydroxybenzene, 4-nitro- or 4-chloro-6-acetylamino-2-amino-1-hydroxybenzene, 6-nitro- or 6-chloro-4-acetylamino-2-amino-1-hydroxybenzene, 4-chloro-5- or -6-nitro-2-amino-1-hydroxybenzene, 6-nitro-4-methyl-2-amino-1-hydroxybenzene, 2-amino-1-hydroxybenzene-4- or -5-sulfonic acid amide, and the corresponding N-methyl-, ethyl-, -isopropyl-, octyl-, cyclohexyl-, -phenyl-, para-chlorophenyl-amides, and also 2-amino-1-hydroxybenzene-4- or 5-sulfonic acid dimethylamide or N-methylphenylamide, 2-amino-1-hydroxybenzene-4- or -5-methylsulfone, 3-amino-4-hydroxy-diphenylsulfone, 4-amino-3-hydroxydiphenylsulfone, and also 5-nitro-2-amino-1-hydroxybenzene, 2-aminobenzene-1-carboxylic acid, 2-aminobenzene-1-carboxylic acid-5-sulfonic acid amide, 2-aminobenzene-1-carboxylic acid-5-sulfonic acid methyl- or -phenyl-amide, 2-aminobenzene-1-carboxylic acid-5-methyl-sulfone and 2-aminobenzene-1-carboxylic acid-5-sulfonic acid phenyl ester.

The cobalt compounds so obtained contain two monoazo-dyestuff molecules bound to one atom of cobalt in complex union, and at least one of the monoazo-dyestuff molecules must correspond to the general Formula 1. The new cobalt compounds are soluble in water, and are indeed more soluble than the starting materials used for making them. They are suitable for dyeing various substances such as plastic masses, waxes, resins, lacquers and the like and especially for dyeing or printing synthetic substances composed of superpolyamides or superpolyurethanes, and above all for dyeing or printing animal materials such as silk, leather and especially wool. They are suitable for dyeing from a weakly alkaline or neutral bath, and above all from a weakly acid, for example, acetic acid bath.

The dyeings so produced are distinguished by their good level character, good properties of wet fastness and very good fastness to light.

The following examples illustrate the invention, the parts and percentages being by weight unless otherwise stated and the relationship of parts by weight to parts by volume being the same as that of the kilogram to the liter:

*Example 1*

30.8 parts of 1-hydroxy-2-aminobenzene-4-sulfonic acid phenylamide-2'-carboxylic acid are dissolved in 150 parts of water and 22 parts of a 10 N-solution of caustic soda. The resulting clear solution is mixed with 25 parts of a 4 N-solution of sodium nitrite, and introduced dropwise at 0–2° C. into a mixture of 110 parts of water and 40 parts of 10 N-hydrochloric acid. The resulting pale yellow diazo suspension is neutralized with sodium carbonate, and added to an ice-cooled solution of 22.9 parts of 1-(4'-chlorophenyl)-3-methyl-5-pyrazolone in 150 parts of water, 10 parts of a 10 N-solution of caustic soda and 15 parts of sodium carbonate. When the coupling is finished the dyestuff is completely precipitated by the addition of sodium chloride and filtered off.

One half of the dyestuff filter cake so obtained is heated in 500 parts of water with 5 parts of a 10 N-solution of caustic soda to 80° C., then mixed with a cobalt sulfate solution containing 1.52 parts of cobalt, and the whole is stirred. A further 4 parts of a 10 N-solution of caustic soda are added, and the mixture is stirred for a short time at 80° C. The dyestuff is then precipitated by the addition of sodium chloride and neutralization with acetic acid.

When dry it is a brown-red powder which dissolves in sodium carbonate solution with a red brown coloration and in concentrated sulfuric acid with a yellow brown coloration. It dyes wool from a neutral or acetic acid bath fast yellow-orange tints.

In the following table are given the properties of further complex metal compounds obtainable in an analogous manner. In column (a) is given the tint of the dyeings produced on wool or fibers of a superpolyamide with the cobalt complex of the dyestuff obtained from the components given in columns I and II.

| | I<br>Diazo component | II<br>Coupling component | (a)<br>Cobalt complex |
|---|---|---|---|
| 1 | 2-amino-1-hydroxybenzene-4-sulfonic acid anthranilic acid amide | CH₃—CO—CH₂—CO—NH—C₆H₅ | Yellow. |
| 2 | 2-amino-1-hydroxybenzene-4-sulfonic acid anthranilic acid amide | CH₃—CO—CH₂—CO—NH—C₆H₄—Cl | Do. |
| 3 | 2-amino-1-hydroxybenzene-4-sulfonic acid anthranilic acid amide | 1-phenyl-3-methyl-5-pyrazolone | Orange yellow. |
| 4 | 2-amino-1-hydroxybenzene-4-sulfonic acid anthranilic acid amide | 6-bromo-2-naphthol | Bordeaux. |
| 5 | 2-amino-1-hydroxybenzene-4-sulfonic acid anthranilic acid amide | 2-hydroxy-8-acetylamino-naphthalene | Violet grey. |
| 6 | 2-amino-1-hydroxybenzene-4-sulfonic acid anthranilic acid amide | 2-naphthol | Bordeaux. |
| 7 | 2-amino-1-hydroxybenzene-4-sulfonic acid anthranilic acid amide | 1,8-dihydroxy-4-chloronaphthalene (with Cl) | Violet. |

(Note: structures shown graphically in original; diazo components 1–6 are 2-amino-1-hydroxybenzene-4-sulfonic acid anthranilide of anthranilic acid; component 7 differs in substitution position of the sulfonamide group.)

| | I<br>Diazo component | II<br>Coupling component | (a)<br>Cobalt complex |
|---|---|---|---|
| 8 | 2-amino-4-(carboxyphenylsulfamoyl)phenol | 1-(4-chlorophenylcarbamoyl)-3-oxo-pyrazolidine-carboxamide type | Orange brown. |
| 9 | 2-amino-4-(carboxyphenylsulfamoyl)phenol | 1-(ethoxycarbonylamino)-6-hydroxynaphthalene | Violet grey. |
| 10 | 2-amino-4-(carboxyphenylsulfamoyl)phenol | 2-naphthol | Bordeaux. |
| 11 | 2-amino-4-(carboxyphenylsulfamoyl)phenol | 1-(4-chlorophenyl)-3-methyl-5-pyrazolone | Orange yellow. |
| 12 | 2-amino-4-(4-carboxyphenylsulfamoyl)phenol | 1-(4-chlorophenyl)-3-methyl-5-pyrazolone | Do. |
| 13 | 2-amino-4-(4-carboxyphenylsulfamoyl)phenol | 2-naphthol | Bordeaux. |
| 14 | 2-amino-4-(carboxycyclohexylmethylsulfonyl)phenol | 1,5-dichloro-8-hydroxynaphthalene | Violet. |
| 15 | 2-amino-4-(N-ethyl-carboxyphenylsulfamoyl)phenol | 2-naphthol | Bordeaux. |

| | I<br>Diazo component | II<br>Coupling component | (a)<br>Cobalt complex |
|---|---|---|---|
| 16 | 4-amino-2-hydroxy-5-chloro-benzenesulfonyl-anthranilic acid | 1-(4-chlorophenyl)-3-methyl-5-pyrazolone | Orange brown. |
| 17 | 2-amino-1-hydroxybenzene-4-sulfonamide of 5-ethoxyanthranilic acid | 1-(4-chlorophenyl)-3-methyl-5-pyrazolone | Orange yellow. |
| 18 | 2-amino-1-hydroxybenzene-4-sulfonamide of anthranilic acid | 2-aminonaphthalene | Grey. |
| 19 | 2-amino-1-hydroxybenzene-4-sulfonamide of anthranilic acid | 2,4-dihydroxyquinoline | Orange. |
| 20 | 2-amino-1-hydroxybenzene-4-sulfonamide of anthranilic acid | 1-butyl-4-hydroxy-2-quinolone | Red orange. |
| 21 | 2-amino-1-hydroxybenzene-4-sulfonamide of anthranilic acid | 4-(2-methylbutan-2-yl)phenol | Reddish brown. |
| 22 | 2-amino-1-hydroxybenzene-4-sulfonamide of anthranilic acid | Barbituric acid | Yellow. |

Example 2

3.66 parts of the dyestuff obtained from diazotized 5-nitro-2-amino-1-hydroxybenzene and 1-acetylamino-7-hydroxynaphthalene and 5.27 parts of the dyestuff from diazotized 2-amino-1-hydroxybenzene-4-sulfonic acid anilide-2'-carboxylic acid and 1-(4'-chlorophenyl)-3-methyl-5-pyrazolone are suspended in 200 parts of water, then mixed with 16 parts by volume of a 2 N-solution of sodium hydroxide, heated to 80° C., and mixed with 22 parts of a cobalt sulfate solution having a cobalt content of 2.95 percent. After heating the mixture for a short time at 78–82° C. the formation of the complex is finished. By the addition of sodium chloride and neutralization with dilute acetic acid, the cobalt compound is completely precipitated. After being filtered off and dried the dyestuff is a dark powder which dyes wool from a weakly alkaline, neutral or weakly acid bath khaki tints.

In the following table are given further mixed cobalt complexes obtainable in an analogous manner from the monoazo-dyestuffs given in columns I and II. The dyestuffs dye wool the tints given in column III.

groups and containing a single carboxylic acid group, which monoazo dyestuff corresponds to the formula

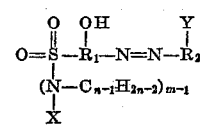

wherein Y represents a member of the group consisting of an amino and a hydroxyl group, $R_1$ represents a benzene radical bound to the azo linkage in ortho-position relatively to the hydroxyl group, $R_2$—Y represents the radical of a coupling component free from sulfonic and carboxylic acid groups and bound to the azo linkage in a position vicinal to the substituent Y, $n$ represents a whole number up to 7, $m$ a whole number up to 2 and X a benzene radical which contains as single salt forming group the said carboxylic acid group.

2. A complex cobalt compound containing one atom of

| | I | II | III |
|---|---|---|---|
| 1 | (structure: OH–C₆H₄–N=N–naphthyl(HO); SO₂NH–C₆H₄–COOH) | (structure: OH–C₆H₄–N=N–naphthyl(HO); SO₂NH–CH(CH₃)–CH₃) | Bordeaux. |
| 2 | (structure: OH–C₆H₄–N=N–C(pyrazolone with C=N, CH₃)–C₆H₄–Cl; SO₂NH–C₆H₄–COOH) | (structure: OH–C₆H₄–N=N–naphthyl(HO); SO₂NH–CH(CH₃)–CH₃) | Brown. |
| 3 | (structure: OH–C₆H₄–N=N–naphthyl(HO)–Br; SO₂NH–C₆H₄–COOH) | (structure: OH–C₆H₄–N=N–C(pyrazolone: C–NH, C=N, CO–NH)–; SO₂–C₆H₄; (CH₂)₃CH₃) | Brownish bordeaux. |

Example 3

2 parts of the cobaltiferous dyestuff obtained as described in Example 1 are dissolved in 4000 parts of water, 10 parts of crystalline sodium sulfate are added and 100 parts of well wetted wool are entered into the resulting dyebath at 40–50° C. 2 parts of acetic acid of 40 percent strength are then added, the temperature is raised to the boil in the course of ½ hour, and dyeing is carried on at the boil for ¾ hour. Finally the wool is first rinsed with cold water and dried. The wool is dyed a fast yellow-orange tint of good fastness to light.

The same dyeing is obtained by dyeing from a neutral bath, that is to say without the addition of acetic acid to the bath.

What is claimed is:

1. A complex cobalt compound containing one atom of cobalt bound in complex union to substantially two molecules of a monoazo dyestuff free from sulfonic acid cobalt bound in complex union to substantially two molecules of a monoazo dyestuff of the formula

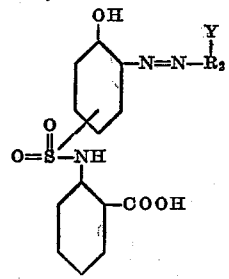

wherein Y represents a member of the group consisting of an amino and a hydroxyl group and $R_2$—Y represents the radical of a coupling component free from sulfonic and carboxylic acid groups and bound to the azo linkage in a position vicinal to the substituent Y.

3. A complex cobalt compound containing one atom of cobalt bound in complex union to substantially two molecules of a monoazo dyestuff of the formula

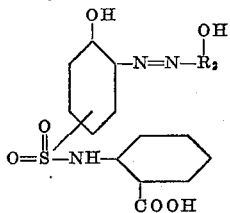

wherein R$_2$—OH represents the radical of a coupling component free from sulfonic acid and carboxylic acid groups and bound to the azo linkage in a position vicinal to the hydroxyl group.

4. A complex cobalt compound containing one atom of cobalt bound in complex union to substantially two molecules of a monoazo dyestuff of the formula

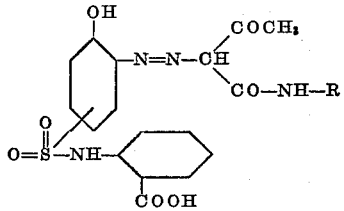

wherein R represents a benzene radical free from sulfonic and carboxylic acid groups.

5. A complex cobalt compound containing one atom of cobalt bound in complex union to substantially two molecules of a monoazo dyestuff of the formula

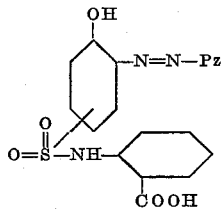

wherein Pz represents a 5-pyrazolone radical free from sulfonic and carboxylic acid groups and bound to the azo linkage in 4-position.

6. A complex cobalt compound containing one atom of cobalt bound in complex union to substantially two molecules of a monoazo dyestuff of the formula

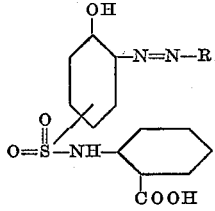

wherein R represents a 2-hydroxynaphthalene radical free from sulfonic and carboxylic acid groups and bound to the azo linkage in 1-position.

7. A complex cobalt compound containing one atom of cobalt bound in complex union to substantially two molecules of a monoazo dyestuff of the formula

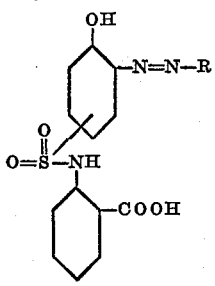

wherein R represents a halogenated hydroxynaphthalene radical free from sulfonic and carboxylic acid groups and bound in a position vicinal to the azo linkage.

8. The complex cobalt compound containing one atom of cobalt bound in complex union with substantially two molecules of the monoazo dyestuff of the formula

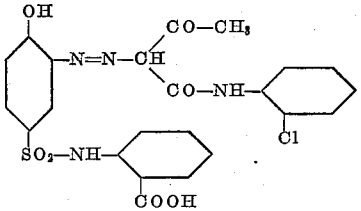

9. The complex cobalt compound containing one atom of cobalt bound in complex union with substantially two molecules of the monoazo dyestuff of the formula

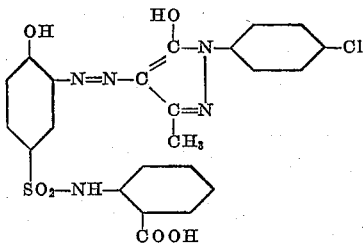

10. The complex cobalt compound containing one atom of cobalt bound in complex union with substantially two molecules of the monoazo dyestuff of the formula

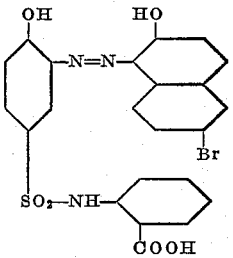

11. The complex cobalt compound containing one atom of cobalt bound in complex union with substantially two molecules of the monoazo dyestuff of the formula

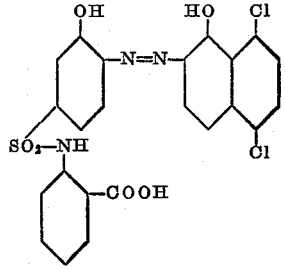

References Cited in the file of this patent
UNITED STATES PATENTS

| | | |
|---|---|---|
| 1,814,218 | Holzach et al. | July 14, 1931 |
| 2,597,676 | Schetty | May 20, 1952 |
| 2,634,263 | Steinemann | Apr. 7, 1953 |

OTHER REFERENCES

Row et al.: J. Soc. Dyers Colourists, vol. 62, 1946, pp. 372–373.